(12) United States Patent
Chew et al.

(10) Patent No.: US 10,129,468 B2
(45) Date of Patent: Nov. 13, 2018

(54) THERMAL DETECTION DEVICE

(71) Applicant: ADE Technology Inc., New Taipei (TW)

(72) Inventors: Yui-Liang Chew, New Taipei (TW); Chu-Sheng Su, New Taipei (TW); Ping-Ying Tu, New Taipei (TW)

(73) Assignee: ADE Technology Inc., New Taipei (TW)

( * ) Notice: Subject to any disclaimer, the term of this patent is extended or adjusted under 35 U.S.C. 154(b) by 0 days.

(21) Appl. No.: 15/956,029

(22) Filed: Apr. 18, 2018

(65) Prior Publication Data
US 2018/0302555 A1 Oct. 18, 2018

(30) Foreign Application Priority Data
Apr. 18, 2017 (TW) .............................. 106112985 A

(51) Int. Cl.
| | |
|---|---|
| *H04N 5/232* | (2006.01) |
| *G03B 17/06* | (2006.01) |
| *G01K 7/16* | (2006.01) |
| *G03B 17/18* | (2006.01) |
| *H04N 5/33* | (2006.01) |

(52) U.S. Cl.
CPC .......... *H04N 5/23235* (2013.01); *G01K 7/16* (2013.01); *G03B 17/06* (2013.01); *G03B 17/18* (2013.01); *H04N 5/23241* (2013.01); *H04N 5/33* (2013.01)

(58) Field of Classification Search
CPC ....... G01K 7/16; H04N 5/23235; G03B 17/06
See application file for complete search history.

(56) References Cited

U.S. PATENT DOCUMENTS

| | | | |
|---|---|---|---|
| 4,343,182 A * | 8/1982 | Pompei | G01J 5/02 374/117 |
| 2013/0162796 A1 | 6/2013 | Bharara et al. | |
| 2017/0186183 A1 * | 6/2017 | Armstrong | G01C 3/08 |

* cited by examiner

*Primary Examiner* — Hugh H Maupin
(74) *Attorney, Agent, or Firm* — Innovation Capital Law Group, LLP; Vic Lin

(57) ABSTRACT

A thermal detection device includes a first camera, a second camera, a thermal camera, and a processor. The thermal camera is disposed between the first camera and the second camera, and detects a to-be-measured object to generate a first temperature value. The processor includes a control unit, which controls the first camera and the second camera according to settings of a first measurement mode and a second measurement mode. In the first measurement mode, the control unit captures images from the first camera and the second camera to measure a first distance between the to-be-measured object and an installation surface. In the second measurement mode, the control unit captures images from the first camera to measure a size of the to-be-measured object. The processor determines a second temperature value of the to-be-measured object according to the first temperature value, the first distance, and the size of the to-be-measured object.

9 Claims, 7 Drawing Sheets

THERMAL DETECTION DEVICE

BACKGROUND OF THE DISCLOSURE

1. Field of the Invention

The present invention relates to a thermal detection device; and specifically, the present invention relates to a thermal detection device that can automatically adjust measurement temperatures to precisely detect surface temperatures of separate target objects.

2. Background

Generally, thermal detection is a technology that can calculate a surface temperature of a to-be-measured object according to surface radiation of the to-be-measured object. Temperature data presented by an existing thermal detection device has an inaccuracy problem. For example, a user manually inputs a distance value after the user estimates a distance. However, the distance value estimated by the user and an actual distance value may have a very large deviation, which causes inaccuracy. This also indicates that the existing thermal detection device cannot actively adjust temperature data and cannot detect temperature data of target objects at different locations or moving target objects simultaneously. In addition, the manual input manner is also inconvenient in use. Therefore, the existing thermal detection device still needs to be improved.

SUMMARY

An objective of the present invention is to provide a thermal detection device that can detect target objects at different locations simultaneously and improve accuracy for a measurement temperature of a to-be-measured object.

The thermal detection device includes a first camera, a second camera, a thermal camera, and a processor. The first camera and the second camera are installed on an installation surface. The thermal camera is disposed between the first camera and the second camera, and detects a to-be-measured object to generate a first temperature value. The processor is coupled to the first camera, the second camera, and the thermal camera. The processor includes a control unit. The control unit controls the first camera and the second camera according to settings of a first measurement mode and a second measurement mode. In the first measurement mode, the control unit captures images from the first camera and the second camera to measure a first distance between the to-be-measured object and the installation surface. In the second measurement mode, the control unit captures images from the first camera to measure a size of the to-be-measured object. The processor determines a second temperature value of the to-be-measured object according to the first temperature value, the first distance, and the size of the to-be-measured object.

DETAILED DESCRIPTION

Figure 1:
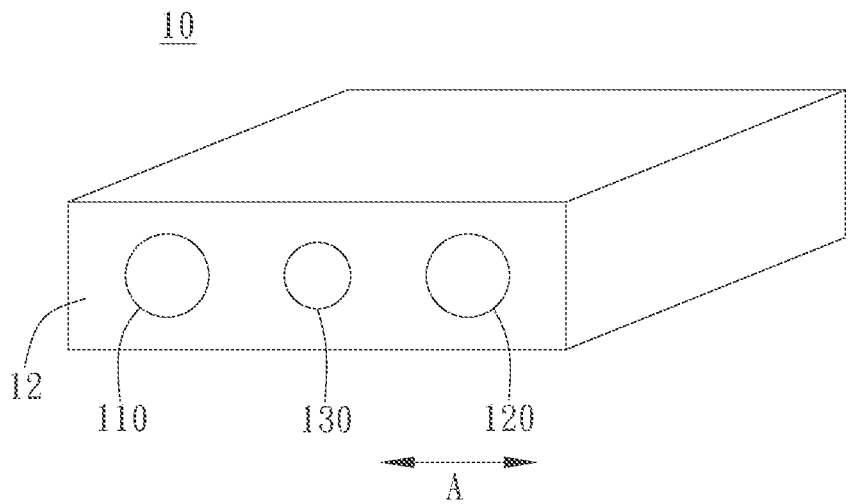
FIG. 1 is a schematic diagram of an embodiment of a thermal detection device according to the present invention.

The present invention provides a thermal detection device, which is used to automatically measure a distance to a to-be-measured object and a size of the to-be-measured object to separately adjust measurement temperatures of target objects. FIG. 1 is a schematic diagram of an embodiment of a thermal detection device 10 according to the present invention. As shown in FIG. 1, the thermal detection device 10 includes a first camera 110, a second camera 120, and a thermal camera 130. The first camera 110 and the second camera 120 are installed on an installation surface 12. The thermal camera 130 is disposed between the first camera 110 and the second camera 120, and detects a to-be-measured object to generate a first temperature value. As shown in the embodiment of FIG. 1, the first camera 110 and the second camera 120 are horizontally disposed along a direction (A). In an embodiment, the first camera 110, the second camera 120, and the thermal camera 130 have the same installation height. In this way, visual ranges of the first camera 110, the second camera 120, and the thermal camera 130 can overlap to improve a detection range.

Figure 2:
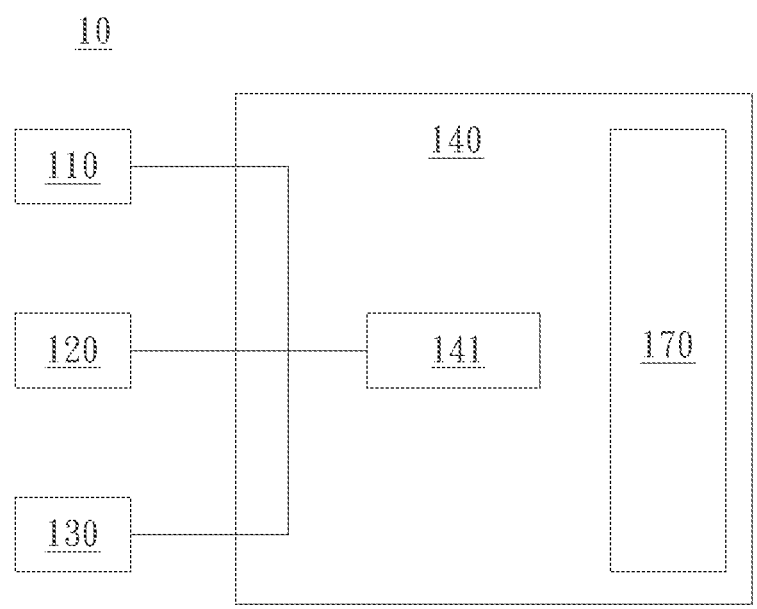
FIG. 2 is a block diagram of an embodiment of a thermal detection device according to the present invention.

Referring to FIG. 2, FIG. 2 is a block diagram of an embodiment of a thermal detection device 10 according to the present invention. As shown in FIG. 2, the thermal detection device 10 further includes a processor 140. The processor 140 is coupled to the first camera 110, the second camera 120, and the thermal camera 130. The processor 140 includes a control unit 141. The control unit 141 controls the first camera 110 and the second camera 120 according to settings of a first measurement mode and a second measurement mode. In an embodiment, the thermal detection device 10 may include a communication unit 170 for transmitting images and operation results (in a wired or wireless manner) to a console.

Figure 3:
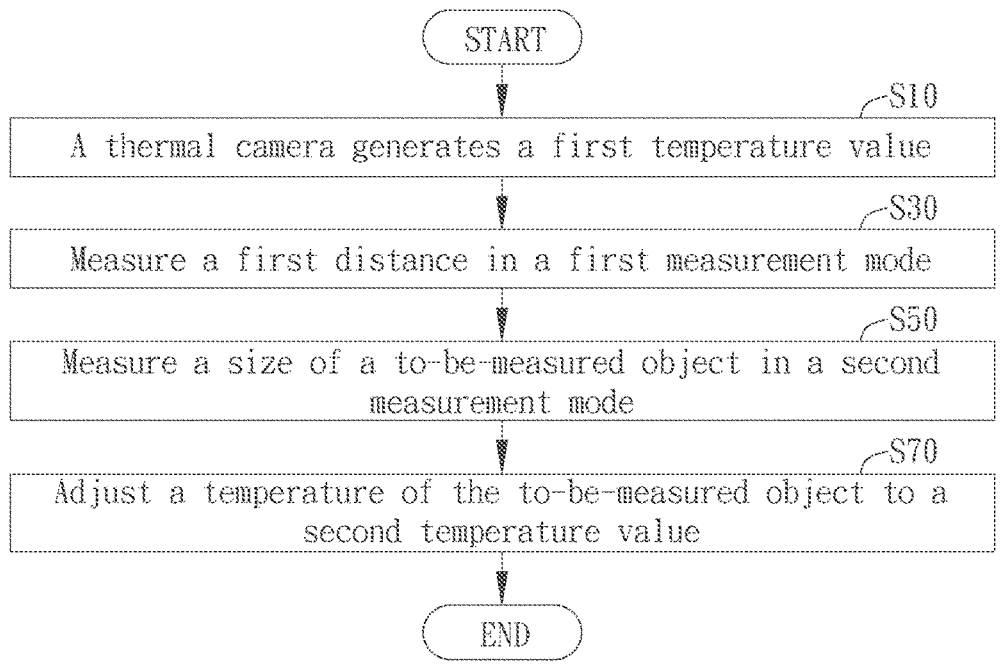
FIG. 3 is a flowchart of an embodiment of temperature adjustment.

FIG. 3 is a flowchart of an embodiment of temperature adjustment. As shown in FIG. 3, in step S10: A thermal camera generates a first temperature value. For example, the thermal camera converts a detected thermal radiation value to a first temperature value. In step S30: Measure a first distance in a first measurement mode. In step S50: Measure a size of a to-be-measured object in a second measurement mode.

For example, in the first measurement mode, a control unit starts a first camera and a second camera, captures images from the first camera and the second camera to measure distances between all pixel points in the images and an installation surface, and records the distances. In the second measurement mode, the control unit captures images from the first camera to measure a size of the to-be-measured object. For example, after a difference between previous and present images is compared, the size (length/width) of the to-be-measured object is determined. In this case, the second camera keeps active, so that the control unit can continuously receive images from the first camera and the second camera to continuously measure distances between each of pixel points in the images and the installation surface. In addition, when determining a location of the to-be-measured object, the processor can capture the previously recorded distances to obtain a first distance between the to-be-measured object and the installation surface. Next, in step S70: Adjust a temperature of the to-be-measured object to a second temperature value. The processor determines the second temperature value of the to-be-measured object according to the first temperature value, the first distance, and the size of the to-be-measured object. In this way, accuracy for the measurement temperature of the to-be-measured object can be improved. It should be understood that, for ease of description, the first camera is started in the second measurement mode in the foregoing, but this is not limited.

Figure 4:
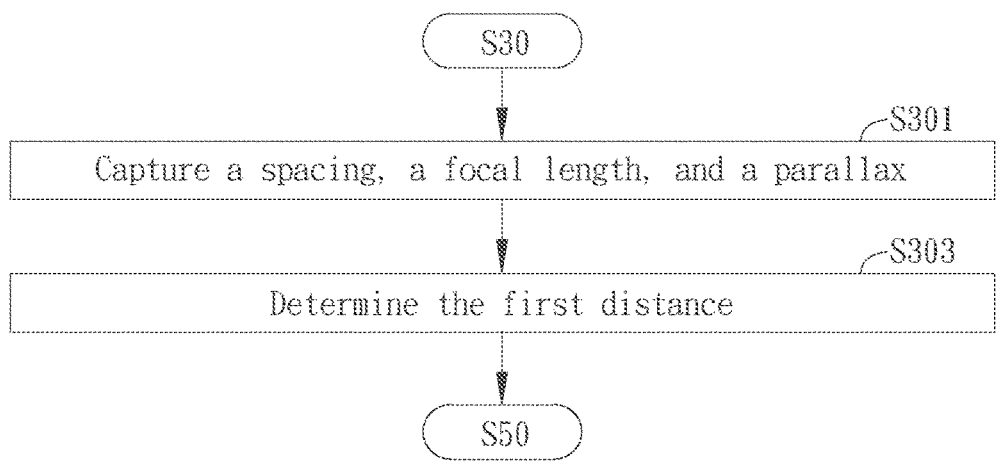
FIG. 4 is a flowchart of an embodiment of a first measurement mode.

FIG. 4 is a flowchart of an embodiment of a first measurement mode. As shown in FIG. 4, in step S301: Capture a spacing, a focal length, and a parallax. Specifically, by means of a first camera and a second camera, the spacing, the focal length, the parallax, and a to-be-acquired first distance have the following relationship:

$$\frac{D}{T} = \frac{f}{d}$$

where f is the focal length between the first camera and the second camera, d is the parallax between the first camera and the second camera relative to the to-be-measured object, T is the spacing between the first camera and the second camera (that is, a length between two cameras along a set direction), and D is the first distance between the to-be-measured object and the installation surface. The spacing, the focal length, and the parallax are captured from system set values to acquire the first distance. Next, in step S303: Determine the first distance.

Figure 5:
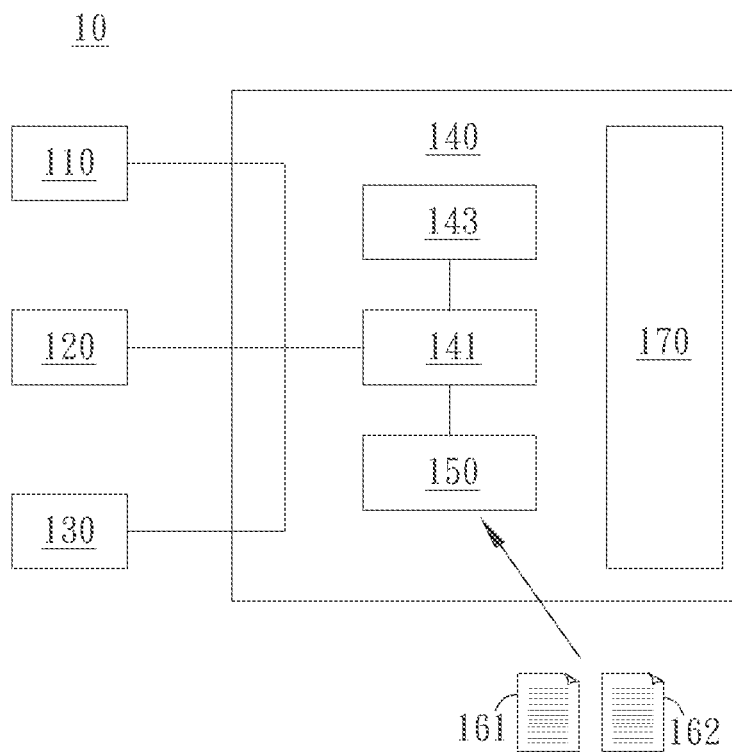
FIG. 5 is a block diagram of another embodiment of a thermal detection device according to the present invention.

FIG. 5 is a block diagram of another embodiment of a thermal detection device 10 according to the present invention. As shown in FIG. 5, the processor 140 further includes an image recognition unit 143 and a storage unit 150. The image recognition unit 143 determines whether a to-be-measured object exists in the image, and determines a first pixel value corresponding to the to-be-measured object. The storage unit 150 stores a correspondence table (for example, a first correspondence table 161 and a second correspondence table 162). The correspondence table includes parameters such as a distance to the to-be-measured object, a size of the to-be-measured object, and a temperature value. The processor can adjust a first temperature value to a second temperature value according to the correspondence table. In an embodiment, the thermal detection device 10 may include a communication unit 170, which can transmit images and operation results (in a wired or wireless manner) to a console.

Figure 6:
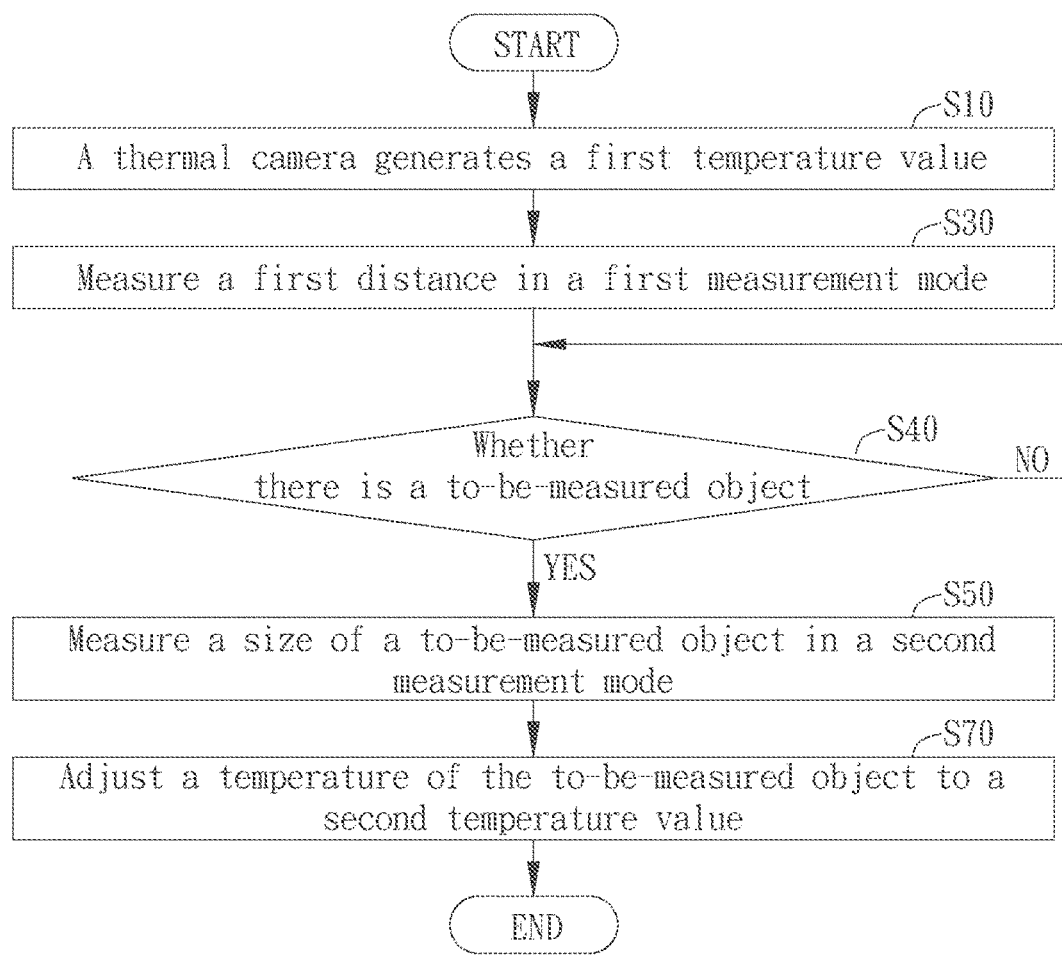
FIG. 6 is a flowchart of another embodiment of temperature adjustment.

FIG. 6 is a flowchart of another embodiment of temperature adjustment. As shown in FIG. 6, in step S10: A thermal camera generates a first temperature value. In step S30: Measure a first distance in a first measurement mode. Next, in step S40: Determine whether there is a to-be-measured object. In step S50: Measure a size of the to-be-measured object in a second measurement mode.

For example, in the first measurement mode, a control unit starts a first camera and a second camera, measures distances between each of pixel points in images and an installation surface by using the images from the first camera and the second camera, and records the distances. When determining a location of the to-be-measured object, an image recognition unit records the location. In addition, when determining the location of the to-be-measured object, the image recognition unit can capture the previously recorded distances, and obtain a first distance between the to-be-measured object and the installation surface. In the second measurement mode, the control unit measures a size of the to-be-measured object by using the images from the first camera. For example, the size of the to-be-measured object is determined by using the first camera and the image recognition unit.

Next, in step S70: Adjust a temperature of the to-be-measured object to a second temperature value. A processor determines the second temperature value of the to-be-measured object according to the first temperature value, the first distance, and the size of the to-be-measured object. In this way, accuracy for the measurement temperature of the to-be-measured object can be improved. It should be understood that, for ease of description, the first camera is started in the second measurement mode in the foregoing, but this is not limited.

Figure 7:
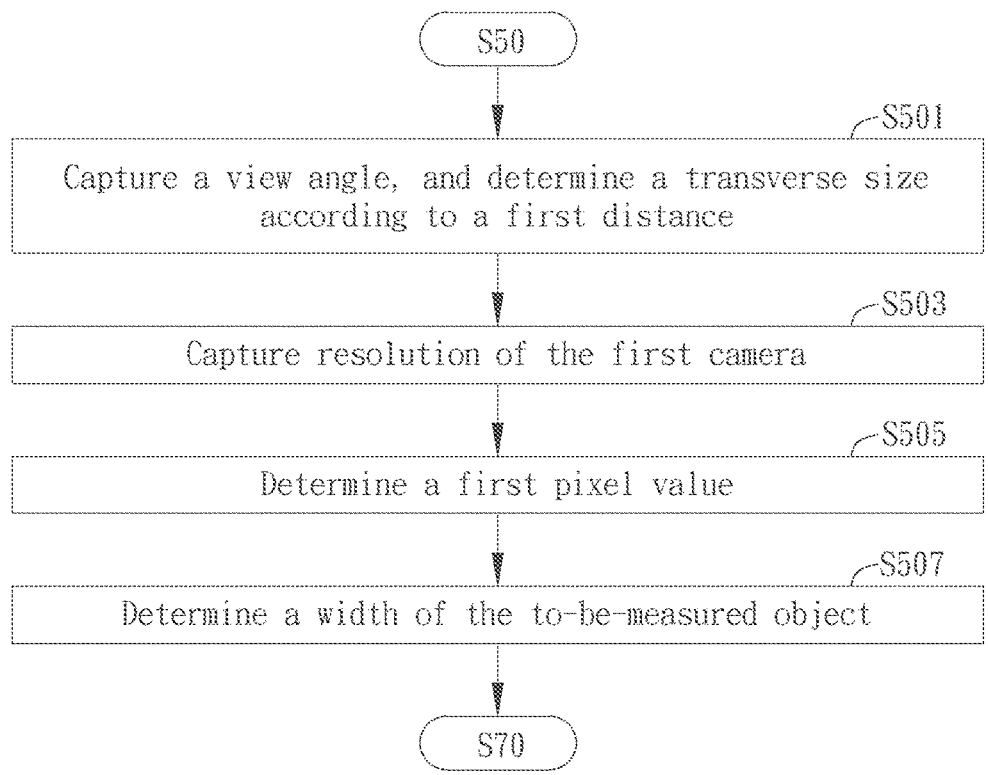
FIG. 7 is a flowchart of an embodiment of a second measurement mode.

FIG. 7 is a flowchart of an embodiment of a second measurement mode. As shown in FIG. 7, in step S501: Capture a view angle, and determine a transverse size according to a first distance. Specifically, by means of a first camera, the view angle and the to-be-acquired transverse size have the following relationship:

$$\tan\theta = \frac{X}{D}$$

where $\theta$ is half of a horizontal view angle of the first camera, D is a first distance between a to-be-measured object and an installation surface, and X is a transverse size of a location of the to-be-measured object.

Next, in step S503: Capture resolution of the first camera. In step S505: Determine a first pixel value. Specifically, by means of the first camera, the resolution, the first pixel value, and a to-be-acquired width of the to-be-measured object have the following relationship:

$$\frac{2X}{P_c} = \frac{W_1}{P_{W1}}$$

where X is a transverse size of a location of the to-be-measured object, $P_C$ is a transverse resolution of the first camera, $P_{W1}$ is the first pixel value corresponding to the to-be-measured object, and $W_1$ is the width of the to-be-measured object. The processor captures the transverse resolution of the first camera. The image recognition unit can recognize the to-be-measured object to obtain the first pixel value corresponding to the to-be-measured object. For example, a range occupied by a human face is recognized to obtain pixel values of a length and a width of the human face. Next, in step S507: Determine the width of the to-be-measured object.

It should be understood that, for a length of the to-be-measured object, the size of the to-be-measured object can also be obtained by using the foregoing similar manner. For example, a vertical view angle of the first camera is captured, and a longitudinal size of the location of the to-be-measured object is determined according to the vertical view angle and the first distance. Then, the length of the to-be-measured object is acquired according to a proportional relationship between the longitudinal size and the length of the to-be-measured object.

The processor determines a second temperature value of the to-be-measured object according to a calculation result of the foregoing relations and in coordination with the correspondence table in the storage unit. For example, the storage unit has a first correspondence table and a second correspondence table, which are represented as follows:

TABLE 1

| $L_1/D$ | $W_1/D$ | Heat loss rate |
|---|---|---|
| M1 | N1 | Q1 |
|  | N2 | Q2 |
|  | ... | ... |
| M2 | N1 | Q3 |
|  | N2 | Q4 |
|  | ... | ... |
| ... | ... | ... |

The foregoing Table 1 is an example of the first correspondence table, and the ratio of the length (L1) of the to-be-measured object to the first distance (D) has different M values (M1, M2 . . . ). The ratio of the width (W1) of the to-be-measured object to the first distance (D) has different N values (N1, N2 . . . ). Each M value has a corresponding heat loss rate (Q1, Q2 . . . ) at different N values. As shown in Table 1, the first correspondence table includes a correspondence between the ratio of the first distance to the size of the to-be-measured object and the heat loss rate. The processor determines the heat loss rate according to the first correspondence table.

In Table 2:

TABLE 2

| First temperature value | Heat loss rate | Compensation temperature difference value |
|---|---|---|
| T11 | Q1 | CV1 |
|  | Q2 | CV2 |
|  | ... | ... |
| T12 | Q3 | CV3 |
|  | Q4 | CV4 |
|  | ... | ... |

The foregoing Table 2 is an example of the second correspondence table, and the first temperature value (T11, T12 . . . ) has a corresponding compensation temperature difference value (CV1, CV2 . . . ) at different heat loss rates (Q1, Q2 . . . ). As shown in Table 2, the second correspondence table includes a correspondence between a first temperature, a heat loss rate, and a compensation temperature difference value. The processor determines the compensation temperature difference value according to the second correspondence table to obtain the second temperature value. In this way, the first temperature value is adjusted to the second temperature value.

Figure 8:
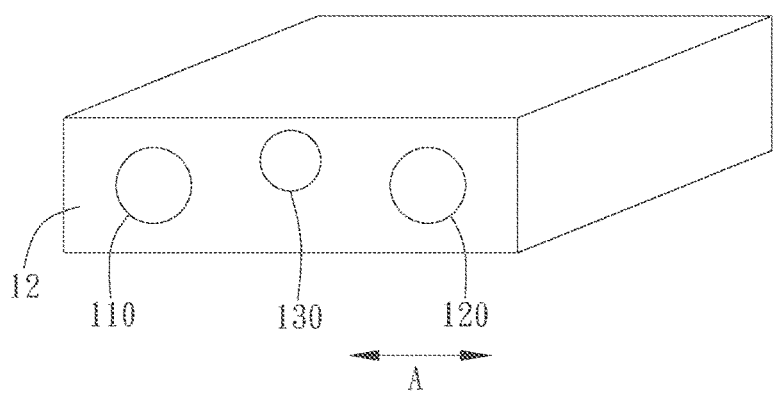
FIG. 8 is a schematic diagram of another embodiment of a thermal detection device according to the present invention.

FIG. 8 is a schematic diagram of another embodiment of a thermal detection device according to the present invention. As shown in the embodiment of FIG. 8, a first camera and a second camera are horizontally disposed along a direction. The first camera, the second camera, and a thermal camera have different installation heights. In other words, the thermal camera can change an installation location according to a shooting requirement and a product design.

Figure 9:
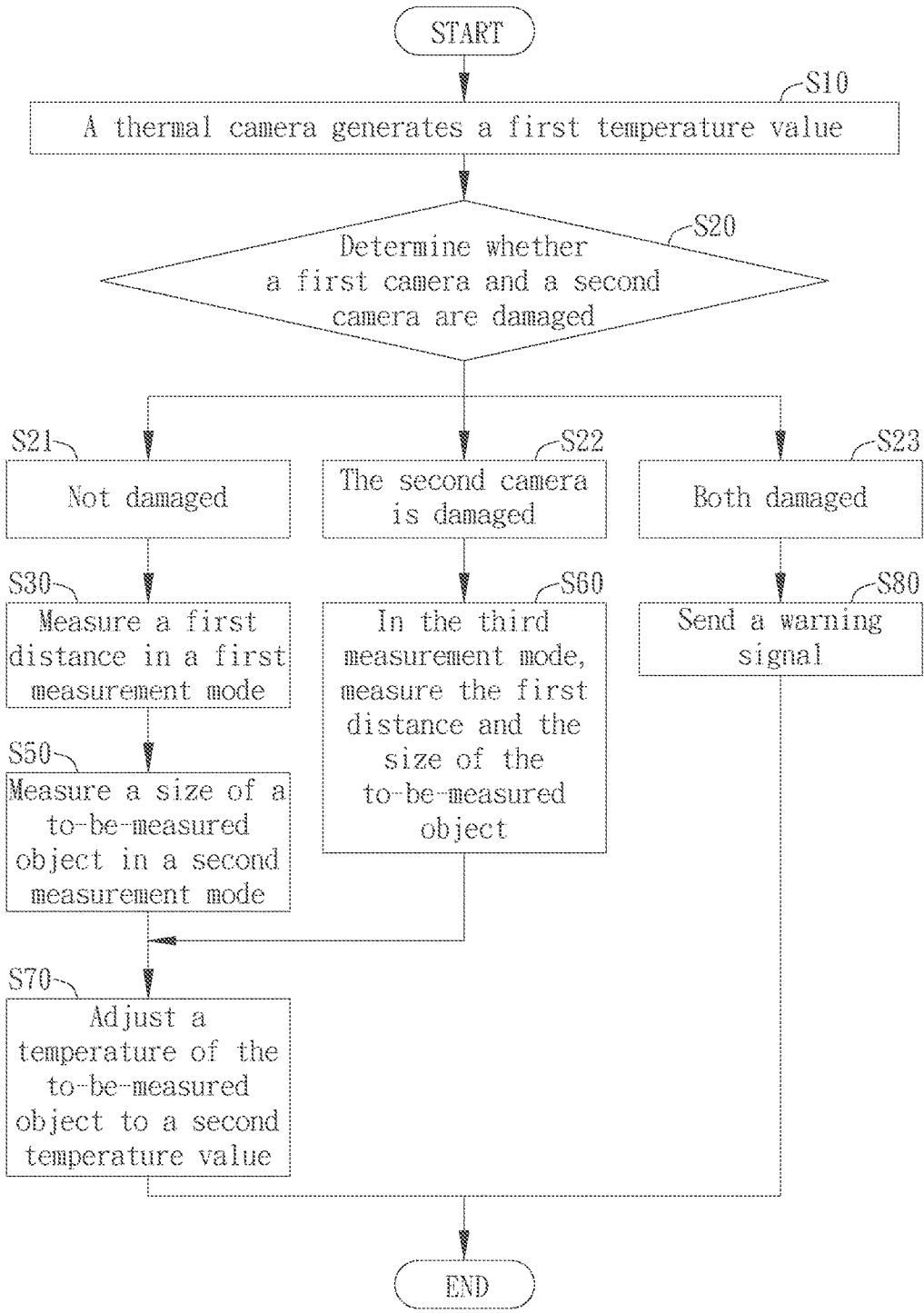
FIG. 9 is a flowchart of another embodiment of temperature adjustment.

FIG. 9 is a flowchart of another embodiment of temperature adjustment. As shown in FIG. 9, a third measurement mode is set in the processor. In step S10: A thermal camera generates a first temperature value. Next, in step S20: Determine whether a first camera and a second camera are damaged. When a result indicates that the first camera and the second camera are not damaged, step S21 is performed. Next, the manner of determining the second temperature value of the to-be-measured object by using step S30, step S50, and step S70 is described as above. Details are not described herein again.

When the result indicates that the second camera is damaged, step S22 is performed. Next, in step S60: In the third measurement mode, measure the first distance and the size of the to-be-measured object. For example, an initial size of the to-be-measured object is determined as a reference value according to a preset condition. In the third measurement mode, the control unit starts the first camera and uses images from the first camera. When determining a location of the to-be-measured object, the image recognition unit records the location. The distance to the to-be-measured object and the size of the to-be-measured object are determined by using the first camera and the image recognition unit according to the initial size. Next, in step S70: Adjust a temperature of the to-be-measured object to a second temperature value.

In addition, when the result indicates that both the first camera and the second camera are damaged, step S23 is performed. For example, the processor can send a warning signal (step S80) by using a communication unit to notify a host end of a faulty event.

Figure 10:
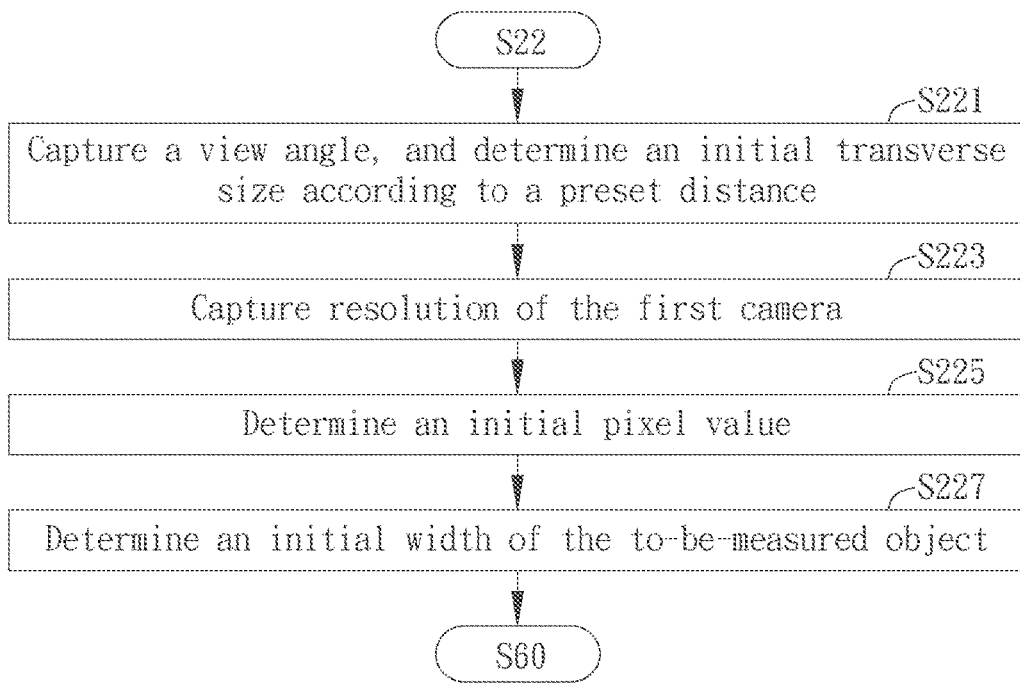
FIG. 10 is a flowchart of an embodiment of a pre-measurement mode.

FIG. 10 is a flowchart of an embodiment of a pre-measurement mode. Before the third measurement mode is entered, a pre-measurement mode is executed to obtain a value in a preset condition as a reference value. As shown in FIG. 10, in step S221: Capture a view angle, and determine an initial transverse size according to a preset distance. Specifically, by means of a first camera, the view angle and the to-be-acquired initial transverse size have the following relationship:

$$\tan\theta = \frac{X_0}{D_0}$$

where $\theta$ is half of a horizontal view angle of the first camera, $D_0$ is a preset distance between a to-be-measured object and an installation surface, and $X_0$ is an initial transverse size of a location of the to-be-measured object. For example, the to-be-measured object (such as a human face, a car . . . ) that is to be recognized and multiple preset distances are established in advance, and this indicates a situation of the to-be-measured object at a particular preset distance. The initial transverse size is acquired according to the preset condition.

In step S223: Capture resolution of the first camera. In step S225: Determine an initial pixel value. Specifically, by means of the first camera, the resolution, the initial pixel value, and the initial width of the to-be-acquired to-be-measured object have the following relationship:

$$\frac{2X_0}{P_c} = \frac{W_0}{P_{W0}}$$

where $X_0$ is a transverse size of a location of the to-be-measured object, $P_C$ is a transverse resolution of the first camera, $P_{W0}$ is an initial pixel value corresponding to the to-be-measured object, and $W_0$ is an initial width of the to-be-measured object. The processor captures the transverse resolution of the first camera. The image recognition unit can recognize the to-be-measured object to obtain the initial pixel value corresponding to the to-be-measured object. Next, in step S227: Determine an initial width of the to-be-measured object. It should be understood that, for the initial length of the to-be-measured object, the initial size of the to-be-measured object can also be obtained by using a manner similar to the foregoing manner.

Figure 11:
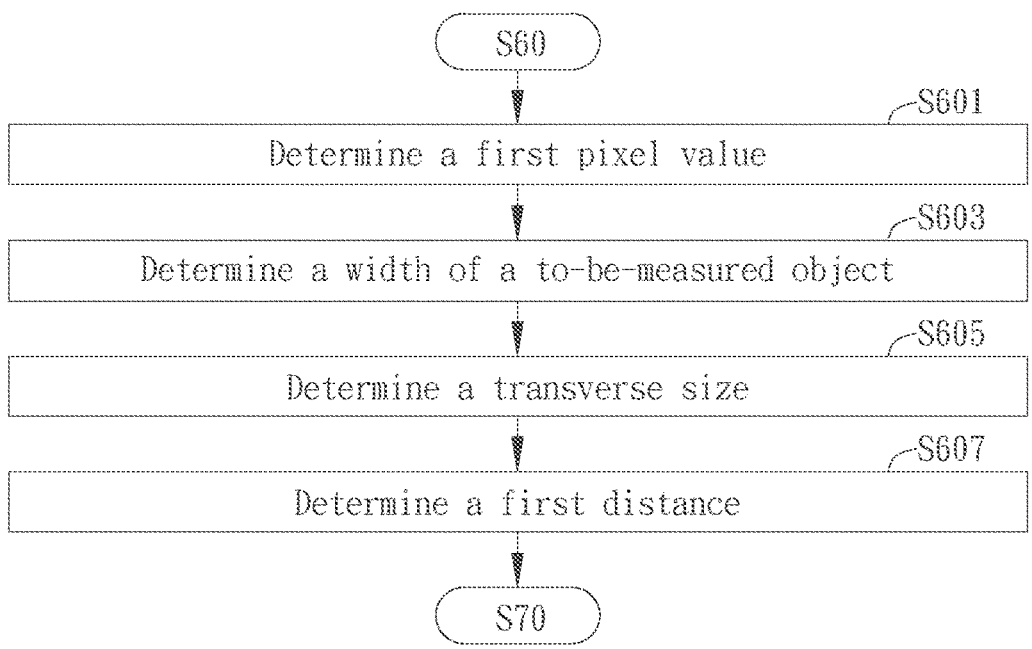
FIG. 11 is a flowchart of an embodiment of a third measurement mode.

FIG. 11 is a flowchart of an embodiment of a third measurement mode. As shown in FIG. 11, in step S601: Determine a first pixel value. In step S603: Determine a width of a to-be-measured object. Specifically, by means of a first camera, the first pixel value and the to-be-acquired width of the to-be-measured object have the following relationship:

$$\frac{W_0}{P_{W0}} = \frac{W_1}{P_{W1}}$$

where $W_0$ is an initial width of the to-be-measured object, $P_{W0}$ is an initial pixel value corresponding to the to-be-measured object, $P_{W1}$ is a first pixel value corresponding to the to-be-measured object, and $W_1$ is the width of the to-be-measured object. For example, after the to-be-measured object is moved, the image recognition unit can recognize the to-be-measured object to obtain the first pixel value corresponding to the to-be-measured object. The processor acquires the width of the to-be-measured object according to the initial width, the initial pixel value, and the first pixel value. It should be understood that, for the length of the to-be-measured object, the length of the to-be-measured object can also be obtained by using a manner similar to the foregoing manner.

Step S605: Determine a transverse size. Specifically, by means of the first camera, the width and the to-be-acquired transverse size have the following relationship:

$$\frac{2X_1}{P_c} = \frac{W_1}{P_{W1}}$$

where $X_1$ is a transverse size of a location of the to-be-measured object, $P_C$ is a transverse resolution of the first camera, $P_{W1}$ is a first pixel value corresponding to the to-be-measured object, and $W_1$ is a width of the to-be-measured object. The processor obtains the transverse size of the location of the to-be-measured object according to the foregoing calculation result.

Step S607: Determine a first distance. Specifically, by means of the first camera, the width and the to-be-acquired first distance have the following relationship:

$$\frac{X_0}{D_0} = \frac{X_1}{D_1}$$

where $D_0$ is a preset distance between the to-be-measured object and an installation surface, $X_0$ is an initial transverse size of the location of the to-be-measured object, $D_1$ is a first distance between the to-be-measured object and the installation surface, and $X_1$ is the transverse size of the location of the to-be-measured object. The processor obtains the first distance according to the foregoing calculation result. In this way, when it is detected that the second camera is damaged, required parameters can be obtained by using the manner shown in FIG. 10 and FIG. 11 so as to adjust the temperature of the to-be-measured object to a second temperature value. In this way, accuracy for the measurement temperature of the to-be-measured object can be improved.

Although the preferred embodiments of present disclosure have been described herein, the above description is merely illustrative. The preferred embodiments disclosed will not limited the scope of the present disclosure. Further modification of the disclosure herein disclosed will occur to those skilled in the respective arts and all such modifications are deemed to be within the scope of the disclosure as defined by the appended claims.

What is claimed is:

1. A thermal detection device, configured to detect a temperature of a to-be-measured object, wherein the thermal detection device comprises:
    a first camera and a second camera, installed on an installation surface;
    a thermal camera, disposed between the first camera and the second camera, and detects the to-be-measured object to generate a first temperature value; and
    a processor, coupled to the first camera, the second camera, and the thermal camera, wherein the processor comprises a control unit, and the control unit controls the first camera and the second camera according to settings of a first measurement mode and a second measurement mode, wherein
    in the first measurement mode, the control unit captures images from the first camera and the second camera to measure a first distance between the to-be-measured object and the installation surface; in the second measurement mode, the control unit captures images from the first camera to measure a size of the to-be-measured object; and the processor determines a second temperature value of the to-be-measured object according to the first temperature value, the first distance, and the size of the to-be-measured object.

2. The thermal detection device according to claim 1, wherein the first camera and the second camera are horizontally disposed along a direction.

3. The thermal detection device according to claim 1, wherein the first camera, the second camera, and the thermal camera have the same installation height.

4. The thermal detection device according to claim 1, further comprising: a storage unit that stores a first correspondence table and a second correspondence table, wherein the first correspondence table comprises a correspondence between a ratio of the first distance to the size of the to-be-measured object and a heat loss rate, and the processor determines the heat loss rate according to the first correspondence table; the second correspondence table comprises a correspondence between the first temperature, the heat loss rate, and a compensation temperature difference value, and the processor determines the compensation temperature difference value according to the second correspondence table to obtain the second temperature value.

5. The thermal detection device according to claim 1, wherein the processor further comprises an image recognition unit, and the image recognition unit determines whether the to-be-measured object exists in images, and determines a first pixel value corresponding to the to-be-measured object.

6. The thermal detection device according to claim 1, wherein in the first measurement mode, the processor acquires the first distance according to a spacing and a focal length between the first camera and the second camera, and a parallax between the first camera and the second camera relative to the to-be-measured object.

7. The thermal detection device according to claim 1, wherein in the second measurement mode, the processor acquires the size of the to-be-measured object according to a view angle and resolution of the first camera, the first distance, and a first pixel value corresponding to the to-be-measured object.

8. The thermal detection device according to claim 1, wherein a third measurement mode is set in the processor, and when the processor detects that the second camera is damaged, the control unit controls the first camera according to settings of the third measurement mode, wherein in the third measurement mode, the processor acquires the size of the to-be-measured object according to a first pixel value corresponding to the to-be-measured object; and the processor acquires the first distance according to a view angle and resolution of the first camera, and the size of the to-be-measured object.

9. The thermal detection device according to claim 8, wherein before the third measurement mode is entered, a pre-measurement mode is executed; in the pre-measurement mode, the processor acquires an initial size of the to-be-measured object according to the view angle and the resolution of the first camera, a preset distance between the to-be-measured object and the installation surface, and an initial pixel value corresponding to the to-be-measured object; and in the third measurement mode, the processor acquires the size of the to-be-measured object according to the initial size, the initial pixel value, and the first pixel value.

* * * * *